UNITED STATES PATENT OFFICE.

OSWALD SCHMIEDEBERG, OF STRASBURG, ASSIGNOR TO C. F. BOEHRINGER & SOEHNE, OF WALDHOF, GERMANY.

PROCESS OF MAKING COMPOUNDS OF IRON AND ALBUMIN.

SPECIFICATION forming part of Letters Patent No. 523,688, dated July 31, 1894.

Application filed October 14, 1893. Serial No. 488,164. (Specimens.) Patented in Germany August 6, 1893, No. 74,533; in England August 18, 1893, No. 15,714, and in Belgium September 15, 1893, No. 106,098.

*To all whom it may concern:*

Be it known that I, OSWALD SCHMIEDEBERG, a subject of the German Emperor, residing at Strasburg, Alsace, in the German Empire, have invented certain new and useful Improvements in the Art of Obtaining Iron Derivatives of Albumin, (for which I have obtained patents in Great Britain, No. 15,714, dated August 18, 1893; in Germany, No. 74,533, dated August 6, 1893; in Belgium, No. 106,098, dated September 15, 1893, and in France, certificate of addition, No. 226,929, dated January 5, 1893;) and I do hereby declare the following to be a full, clear, and exact description of the invention, such as will enable others skilled in the art to which it appertains to make and use the same.

This invention relates to the artificial production of iron derivatives of albumin, and its object is to produce iron compounds of the same character, and capable of ready assimilation by the animal organism, in the same proportion, as certain iron-derivatives which have been shown to exist in food and in the body of animals. These compounds, which have been described and claimed in a patent to myself and Pio Marfori, dated October 3, 1893, No. 505,986, may be used as an article of food, or a medicinal compound, in the manner set forth in that patent.

The present invention involves an improvement on the method set forth and claimed in the said patent, consisting in causing a separation of unchanged albumin and other bodies not completely bound in the iron albumin derivative, by means of an acid, to take place before the first precipitation of the iron derivative of albumin. By this modification of the process carried out under the aforesaid patent, I attain the advantage of greater certainty in obtaining compounds of a uniform and definite composition and uniform in their properties.

Under the present invention, I preferably proceed as follows: The albuminous solution, in the proportion of one hundred parts of albumin to about two thousand parts of cold distilled water, having been first treated successively with first, twenty-five parts of ferrous or ferric tartrate dissolved in two hundred and fifty parts of distilled water, and neutralized with a ten per cent. soda-lye; second, one hundred parts of a neutral ten per cent. solution of tartrate of sodium; third, thirty-eight parts of a ten per cent. soda-lye, according to the aforesaid patent, and having been heated to a temperature of 90° centigrade, for about five hours on the water-bath, a current of steam is conducted through the solution, so as to maintain the same at a temperature of 96° centigrade, and cause it to boil and bubble. Then, while maintaining the current of steam, and causing the ebullition and agitation of the liquid to continue without interruption, small quantities of an acid, such as tartaric acid, hydrochloric, or other suitable acid, are gradually added until the liquid reacts completely neutral. Thereupon, after the lapse of a few minutes, additional quantities of acid are added until a slightly acid reaction of the solution occurs. By this treatment, the solution, which is maintained in a continuously boiling condition by the current of steam, becomes clearer by degrees, the impurities therein contained being separated in the form of deposits after the lapse of a few minutes.

When the solution has been completely clarified, it is allowed to cool to 15° centigrade, and is then filtered. The filtrate is then further treated under the process set forth in my aforesaid patent, that is to say, it is first treated with a twenty-five per cent. solution of ammonia, and kept at a temperature of 92° centigrade, for forty-eight hours, then allowed to cool, then treated with a twenty-five per cent. solution of tartaric acid, until distinct acid reaction occurs, whereby the iron derivative of albumin is precipitated, which is then placed on the filter and washed until no more iron can be detected in the filtrate.

As under the aforesaid patent, the precipitate or moist mass remaining on the filter may be further purified by dissolving the same in fourteen hundred parts of distilled water, to which twenty parts of a twenty-five per cent. ammonia solution and twenty parts of a ten per cent. neutral or weakly alkaline solution of tartrate of ammonium are added, and then maintaining at a temperature of 90° centigrade, for not less than twelve, and preferably, forty-eight hours, the mixture being then thoroughly cooled and treated with a twenty-five per cent. solution of tartaric acid, until a distinct acid reaction occurs, when the precipitate is filtered and washed until the acid reaction disappears. The resultant moist mass is then dried at a slightly raised temperature, when it forms an amorphous brown powder, or thin scales of a brown color. It contains from seven to ten per cent. of iron which, however, is not bound in the molecule as in the ordinary iron-salts. It is insoluble in slightly acidulated water and in alcohol, but readily soluble in weakly alkaline water. A neutral solution of the same will not coagulate on boiling.

A further test is the following: If twenty cubic centimeters of the heated ammoniacal solution, containing 0.06 grams of the iron derivative of albumin so produced are treated in the cold with a drop of a fifty per cent. aqueous solution of sulfid of ammonium, ("*Fresenius Qualitative Analyse*," 14th edition, page 68,) the same remains unchanged for three minutes. Thereafter, a gradual darkening of its color takes place.

The advantage of the present improved process is, that all the ingredients of the solution containing the new iron derivative of albumin, which have not been completely bound or fixed in the said iron derivative—and which may consist of albumin or other intermediate compounds—are removed and separated from the solution before the derivative is precipitated. Hence the far greater certainty of obtaining at all times a compound of uniform and definite composition.

The above constitutes what I consider the best way of carrying the invention into effect. The method may, however, be modified in various ways, without departing from the essence of the invention. Thus, for example, in place of the soda salt of tartaric acid, other alkali-salts of tartaric and other acids may be used, provided they are capable of retaining the iron in solution in the presence of alkaline solution or lyes. But it is even possible to dispense with such alkali-salts when the albuminous substances are of themselves capable of retaining the iron salts in solution in the presence of an alkali, such as soda-lye, &c. It should also be observed that other acids may be used, and other iron salts than that set forth may be employed. Other alkaline solutions may also be used with advantage. The temperature and proportions may also be modified within certain limits.

As already stated in the aforesaid patent, the products of the present process may be used as a food or a medicine in the dried solid state, or in solution. It may also be combined with other substances to form various alimentary and pharmaceutical preparations. It may be advantageously used as a ten per cent. solution.

In order to sterilize such solution, it is heated in corked bottles for forty-eight hours at a temperature of at least 95° centigrade.

The solution has a dark-brown color, and a very slight smell and taste, and reacts neutral.

By acids and the addition of larger quantities of alcohol, the iron-albumin derivative is percipitated from the solution, the supernatant liquid appearing as clear as water. The precipitate may again be dissolved by addition of ammonia in sufficient quantity.

With respect to sulfid of ammonia, the above solution shows the same characteristic reaction as the dried preparation.

What I claim, and desire to secure by Letters Patent, is—

1. The process of obtaining an iron derivative of albumin, which consists in first obtaining the same in the form of a heated solution, and then, before precipitating the iron derivative, maintaining the solution at a high temperature, and, at the same time, acidulating the same, whereby all impurities are separated from the iron derivative of albumin, in solution, substantially as set forth.

2. The process of obtaining an iron derivative of albumin; which consists in keeping an albuminous substance in solution in the presence of an iron-salt and an alkali and acidulating the heated solution before the iron derivative of albumin is precipitated out of the solution, whereby all ingredients not bound in the iron derivative, such as free albumin and intermediate compounds, are separated from the solution, substantially as set forth.

3. The process of obtaining an iron derivative of albumin, which consists in keeping an albuminous substance in solution in the presence of an iron-salt and an alkali, for about five hours, and at a temperature of about 90°, centigrade, then introducing a current of steam into the mixture, so as to maintain the same at about 96°, centigrade, and, at the same time, adding small quantities of acid until the solution reacts first neutral and then slightly acid, substantially as and for the purposes set forth.

In testimony whereof I affix my signature in presence of two witnesses.

OSWALD SCHMIEDEBERG.

Witnesses:
　W. HAUPT,
　L. A. EDWARDS.